United States Patent [19]

Tano et al.

[11] Patent Number: 4,692,012

[45] Date of Patent: Sep. 8, 1987

[54] AUTOMATIC FOCUS ADJUSTMENT APPARATUS

[75] Inventors: Touru Tano, Kakogawa; Akihiro Fujita, Mie; Takayuki Utsumi, Gifu, all of Japan

[73] Assignee: Kowa Company Ltd., Nagoya, Japan

[21] Appl. No.: 843,180

[22] Filed: Mar. 24, 1986

[30] Foreign Application Priority Data

Mar. 27, 1985 [JP] Japan ................................. 60-60994

[51] Int. Cl.[4] ............................................. G03B 3/00
[52] U.S. Cl. ................................................... 354/403
[58] Field of Search ............................... 354/402, 403; 250/201 PF, 201 AF, 204; 358/227; 352/140

[56] References Cited

U.S. PATENT DOCUMENTS 4,268,137 5/1981 Cocron et al. ...................... 354/403

Primary Examiner—W. B. Perkey
Attorney, Agent, or Firm—Robert E. Burns; Emmanuel J. Lobato

[57] ABSTRACT

An automatic focus adjustment apparatus adapted for use with cameras includes an automatic focusing means for shifting an imaging objective for automatic focusing in response to an output signal from a pair of photo-detectors which receives light radiated from a light emitting element and then reflected from a subject to be photographed. The in-focus range in which the pair of photo-detector means is deemed to receive the substantially equal amount of light is enlarged when the amount of light received by the pair of photo-detector means is smaller than a predetermined amount of light.

7 Claims, 10 Drawing Figures

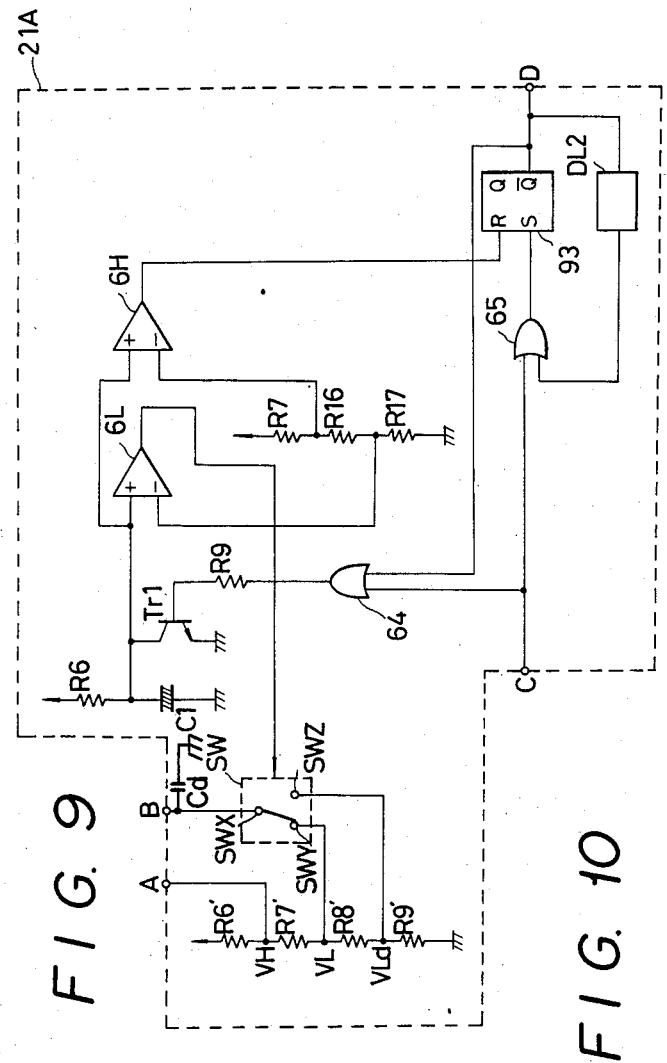
F I G. 9
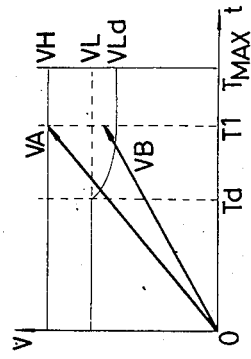
F I G. 10

AUTOMATIC FOCUS ADJUSTMENT APPARATUS

BACKGROUND OF THE INVENTION

1. Field of the Invention

The present invention relates to an automatic focus adjustment apparatus, and more particularly to an automatic focus adjustment apparatus which detects the deviation amount of the focal position of an optical system as the difference between the outputs of a pair of light receiving means, which performs a shifting of the optical system in response to the amount of detected focal deviation, and terminates the shifting of the optical system when the above stated signal difference is in a predetermined in-focus range.

2. Description of the Prior Art

In recent years, the automating of the operation of various photographic apparatus has advanced and various methods have been proposed relating particularly to auto-focus adjustment apparatus. FIG. 1 shows the principle of an auto-focus adjustment apparatus as known in the art, as seen from Japanese Patent specification Nos. 809/84 or 15244/85.

In FIG. 1 the symbol L0 indicates an objective for use in camera photography which is shifted along an optical axis X by a drive means such as a motor or the like. Two lenses L1 and L2 are arranged on both sides of the objective L0, behind which a light source I and a pair of photodiodes DA and DB are respectively provided. The photodiodes DA and DB are constructed to shift at roughly a right angle to the optical axis X in response to the shift moving of the objective L0.

In the above arrangement auto-focus adjustment is performed as follows.

Light from the light source I is radiated through the lens L1 at a photo-subject along the optical axis X, and the light reflected therefrom is directed through the lens L2 onto the photodiodes DA and DB. The light from the light source I is radiated at a fixed radiation angle, thus the distance from the optical axis X of the photodiodes receiving the light reflected from a photo-subject varies along an axis perpendicular to the optical axis x in dependence on the distance of the photo-subject from the optical system. Accordingly, if the movement of the objective L0 and the two photodiodes DA and DB is adjusted such that the volume of reflected light is incident in equal amounts on the two photodiodes DA and DB in the state of the properly focused objective, it is possible to perform focus adjustment automatically by checking the outputs of the photodiodes DA and DB.

Prior art active auto-focus adjustment systems as described above have the drawback that when a photo-subject is at a great distance or when a source of light disturbing the light signal from the light source I is in the front of the camera, the signal to noise ratio in the reflected light detected by the photodiodes becomes poor and normal focus adjustment cannot be performed.

When the signal to noise ratio is degraded, despite the camera being in a focused condition and the position of the camera and the photo-subject not changing, there are cases in which the objective will shift due to disturbing light, and unseemly problems will occur such as the obscuring of focus, and changes in image size.

In view of the above problems, improved prior art auto-focus adjustment apparatus have been advanced which can reliably perform auto-focus adjustments even in the presence of the disturbing light.

An explanation of such an example of prior art will be given below with reference to FIG. 2. In the arrangement to be explained below, the gearing system of the camera objective and the photodiodes DA and DB for detecting reflected light will be considered to be of a configuration similar to that of the prior art shown in FIG. 1.

FIG. 2 shows a circuit diagram of an auto-focus adjustment apparatus in which symbols DA and DB indicate adjacently arranged photodiodes used for detecting reflected light. The output of the photodiodes DA and DB are amplified by amplifiers 1A and 1B, and then sent to filters 2A and 2B, respectively.

A light source I is driven at an oscillation frequency of a reference oscillator 13 via a radiance control element 14 equipped with a driver. In order to prevent the disturbance of the incident light, the frequency chosen preferably differs from the frequencies of commercial use power supplies used for indoor lighting systems.

Accordingly, filters 2A and 2B are provided so that only signals in the range of the light emitted from the light source I are allowed to pass through. The output of the filters 2A and 2B are input via electrically operated switches 3A and 3B to integrators 4A and 4B.

Output voltage VA of the integrator 4A is input to the non-inverting input terminals of comparators 5AH and 5AL. Output voltage VB of the integrator 4B is input to the non-inverting input terminals of comparators 5BH and 5BL.

Power supply voltage divided by serially connected resistors R1-R3 is supplied in threshold voltages through connection points A and B to the inverting input terminals of each of the comparators. A voltage VH at the connection point of the resistors R1 and R2 is supplied to the comparators 5AH and 5BH as threshold voltage.

A voltage VL of the connection point of the resistors R2 and R3 is supplied to the comparators 5AL and 5BL. These voltages VH and VL are determined in accordance to the degree of focusing precision required.

The output of the comparators 5AH and 5BH are connected to the input of an OR-gate 61. The output of the OR-gate 61 is input to an inverter 71, a delay circuit DL1 comprising a mono-multi vibrator and the like, the trigger terminals of D flip-flops 91 and 92, and a connection point C of a block 20. When one or the other of the comparators 5AH or 5BH becomes high level, a high level pulse is output, and the D flip-flops 91 and 92 are triggered by this pulse.

The outputs of the comparators 5AL and 5BL are applied to the data inputs of the respective D flip-flops 91 and 92. The non-inverting output of the D flip-flop 91 and the inverting output of the D flip-flop 92 are input to AND-gate 82, and the inverting output of the D flip-flop 91 is input to the AND-gate 83. The third input terminal of the AND-gate 82 and the other input terminal of the AND-gate 83 are connected through resistors R4 and R5, respectively, to power supply voltage, and the electrical potentials of both of these input terminals are controlled by switches 3C and 3D which are normally open. The switches 3C and 3D are provided respectively on both edges of the travel range of the objective, and when the objective shifts to the infinity mark or to the maximum close range position, the switches 3C and 3D suppress the AND-gates 82 and 83, whereupon the movement of the objective by the motor 11 is terminated.

A motor controlling circuit 10 bi-directionally drives the motor 11 which moves the objective in response to the output of the AND-gates 82 and 83. The motor 11 is pre-coordinated to move in accordance to the amount of light incident on the photo-diodes DA and DB in the direction which will equalize the above-mentioned amounts. The connection point C of the block 20 is connected to one input of an OR-gate 63, and the output of the OR-gate 63 is connected to the reset terminal of a counter 12. The clock input of this counter 12 is connected through a connection point E to the above stated reference oscillator 13, and advances with the fall of the clock pulse of the reference oscillator 13. At the same time, the clock pulse output of the reference oscillator 13 is connected through the connection point E to the other input terminal of an AND-gate 84. The output of this AND-gate 84 is connected to the remaining input of the OR-gate 63. An output Qn of the counter 12 is connected to the top input of the AND-gate 84.

The output Qn of the counter 12 resets the D flip-flops 91 and 92 via the connection point D, and is concurrently connected to the top input of the OR-gate 62. The output of the OR-gate 62 resets the integrators 4A and 4B, and the output of the inverter 71 works to open the switches 3A and 3B.

Next, a detailed explanation of the operation of the above described arrangement will be given below.

The photodiodes DA and DB produce signals depending on the amount of light received, and only the radiation frequency component of the light source I of these output signals is extracted by the filters 2A and 2B, respectively, and sent through the normally closed switches 3A and 3B to the integrators 4A and 4B. The output voltages of each of the integrators are described, as shown in FIG. 3, in accordance to the amount of light received after the commencement of measuring.

A case will be described below in which the output voltages of the integrators 4A and 4B are increased over time in a manner indicated by the reference symbols VA and VB'.

The amount of light incident on the side of the photodiode DA is greater, thus at a time T the integrated voltage VA reaches the threshold value VH of the comparator 5AH. Accordingly, the comparator 5AH inverts, and a high level is output from the OR-gate 61, whereupon the D flip-flops 91 and 92 are triggered. At this time, the data input of the D flip-flop 91 is high level because, as may be seen in FIG. 3, the voltage VA has already exceeded the threshold value VL of the comparator 5AL. Further, the data input of the D flip-flop 92 is low level because the voltage VB', at this point, has not yet reached the voltage VL.

Accordingly, the D flip-flop 91 and the D flip-flop 92 produce high and low level signals, respectively, due to the triggering of each flip-flop. Needless to say, since the respective inverting outputs produce voltages opposite thereto, the inputs of the AND-gate 82 are all high level and the inputs of the AND-gate 83 become high level and low level. Therefore, the AND-gate 82 produces a high level signal, and the AND-gate 83 a low level signal.

Accordingly, the motor controlling circuit 10 drives the motor 11 and shifts the objective and the photodiodes such that the amount of light received by the photodiode DB increases. In the event that the balance of the amounts of received light is reversed, the objective is shifted in the direction opposite that stated above by an exactly similar operation.

Simultanuously with the triggering of the D flip-flops 91 and 92, the integrators 4A and 4B are cut off via the inverter 71, and reset to their initial values by means of the OR-gate 62 following the elapse of a time delay established by the delay circuit DL1. The counter 12 inside the block 20 is also reset via the OR-gate 63.

This counter 12 establishes the maximum period of integration, and after the counter 12 is reset at the end of a measuring period in the above stated manner, if during a next operation the counter 12 has not been reset by the time it has counted a fixed number of clock pulses of the reference oscillator 13, it will be determined that a sufficient amount of measured light could not be received, whereupon the counter 12 generates a short pulse to reset the D flip-flops 91 and 92 and the integrators 4A and 4B. Simultaneously, the counter 12 resets its own count value via the AND-gate 84 in synchronization with the clock pulse.

In the event that the respective integrator values increase in a manner indicated by the symbols VA and VB, when the voltage VA has reached the voltage VH, the comparators 5AL and 5BL have already inverted in concert, thus the outputs of the D flip-flops 91 and 92 become high level together. Accordingly, the AND-gates 82 and 83 are isolated concurrently, whereupon the motor 11 is suspended and the movement of the objective is restrained. When one or the other of the output integration values of the photodiodes DA and DB reaches the voltage VH, in the event that the other output value is the same or higher than the voltage VL, it means that an in-focus condition has been established.

FIG. 4 shows another embodiment of the prior art in which the block 20 in FIG. 2 is replaced by a block 21, and the non-inverting input of the comparator 6H is connected to the connection point of a resistor R6 and a capacitor C1. The collector of a transistor Tr1 is also connected to this connection point. The other end of the resistor R6 is connected to power supply voltage, and the other end of the capacitor C1 is connected to ground.

The connection point of resistors R7 and R8 which divide power supply voltage are connected to the inverting input of a comparator 6H. The output of the comparator 6H is connected to the reset input of a RS flip-flop 93. The point C is connected to the left and top inputs of OR-gates 64 and 65, respectively. The output of the OR-gate 65 is connected to the set input of the RS flip-flop 93. The output of the OR-gate 64 is connected through a resistor R9 to the base of the transistor Tr1. The emitter of the transistor Tr1 is connected to ground.

The inverting output of the RS flip-flop 93 is connected to the one input of the OR-gate 64 and to a point D, and concurrently through a delay circuit DL2 to the other input of the OR-gate 65.

Next, an explanation will be given below of the operation of the arrangement of FIG. 4.

When one or the other of the outputs VA and VB of the integrators 4A and 4B reach the voltage VH, a positive pulse appearing at the point C, in a manner similar to the apparatus of prior art described above, causes the transistor Tr1 to be turned ON via the OR-gate 64 and the resistor R9, and discharges the capacitor C1. Simultaneously, the pulse sets the RS flip-flop 93 via the OR-gate 65.

The capacitor C1 commences charging via the resistor R6 when the pulse from the point C disappears.

The electrical potential of the capacitor C1 is compared to the electrical potential of the connection point of the resistors R7 and R8 by the comparator 6H, and when the electrical potential of the capacitor C1 exceeds the electrical potential of the connection point, the comparator 6H produces a high level signal, and resets the RS flip-flop 93.

The inverting output of the RS flip-flop 93 produces a high level signal and resets via the point D the D flip-flops 91 and 92, and the integrators 4A and 4B, and concurrently causes the transistor Tr1 to be turned ON via the OR-gate 64 and the resistor R9, whereupon the capacitor C1 discharges. Further, the inverting output of the RS flip-flop 93 resets itself via the delay circuit DL2 and the OR-gate 65.

At this time, the delay circuits DL1 and DL2 establish a time delay sufficient for discharging the capacitor.

Accordingly, the maximum period of integration is set according to the time constant of the resistor R6 and the capacitor C1 and the voltage division ratio of the resistors R7 and R8.

Prior to the elapse of the maximum period of integration, in the event of the outputs VA or VB of the integrators 4A and 4B reach the reference electrical potential VH, a positive pulse appears at the point C which turns on the transistor Tr1 via the OR-gate 64 and the resistor R9, whereupon the capacitor C1 discharges, and then subsequently recommences charging. Accordingly a mono-stable multi-vibrator-like function with a re-triggering capability is realized. In this manner, a maximum integration period is established, afresh.

In the above two embodiments in the prior art the performance of auto-focus adjustment is possible even in the event that there is a certain level of the disturbing light or a photo-subject is comparatively far away. However, with video cameras of recent make there is a trend toward the attachment of high magnification zoom lenses, in which case there is a need for auto-focus adjustment systems which can perform range finding to great distances.

The problem in such cases lies in the deterioration of the signal to noise ratio of the light signal received. The principal reason for this is the attenuation of reflected light when the photo-subject is at a great distance or the reflexibility of a photo-subject is poor.

When the signal to noise ratio deteriorates, the below described phenomena occur.

We shall assume ideal conditions of no noise and consider the above stated output integration values VA and VB of the integrators to be in a condition denoted by VA and VB of FIG. 5. In this case an in-focus condition is ascertained and the motor 11 used for shifting the objective is suspended. If the positional relationship of the photo-subject and the camera does not change, the integration values VA and VB maintain the condition of FIG. 5. However, in reality, noise does exist, thus there are instances in which VB which is based on the received light signal changes to VB' or VB" (actually, integration time also changes, but for the present this is ignored).

In the event that an integration voltage such as VB' is obtained, as before, an in-focus condition is ascertained and the motor remains suspended. In the event of VB", when VA reaches the reference voltage VH, an out-of-focus condition is adjudged and the motor is driven because VB" has not reached the reference voltage VL.

As a result, when the signal to noise ratio of the signal component deteriorates, the so-called apparent dead zone narrows. If the signal to noise ratio deteriorates further, the apparent dead zone disappears, and hunting starts.

A method which increases the radiance of the light source sending the light signal is conceivable as a countermeasure to improve the signal to noise ratio, however recent years have seen a trend toward low power consumption electrical equipment thus making implementation of the concept problematic.

SUMMARY OF THE INVENTION

It is therefore an object of the present invention to provide an automatic focus adjustment apparatus capable of performing an improved automatic focus adjustment even in the presence of disturbing light.

It is another object of the present invention to provide an automatic focus adjustment apparatus capable of performing an accurate automatic focus adjustment even if the amount of light signal received is small due, for example, to the photo-subject being at a comparatively great distance, or to the poor reflexibility of a photo-subject.

It is still another object of the present invention to provide an automatic focus adjustment apparatus capable of effecting an accurate and stable focus adjustment at low level power consumption.

In accordance with the present invention, an automatic focus adjustment apparatus includes an automatic focusing means for shifting imaging optical system along its optical axis in response to an output signal from a pair of photo-detector means for automatic focusing until each of the pair of photo-detector means receives a substantially equal amount of light reflected from a subject to be photographed. The apparatus according to the present invention further includes means for determining an in-focus range in which said pair of photo-detector means is deemed to receive the substantially equal amount of light. The in-focus range is enlarged when the amount of light received by the pair of photo-detector means is smaller than a predetermined amount of light.

The automatic focus adjustment apparatus according to the present invention thus measures the deviation amount of the focal position of an optical system as the difference between the output signals of a pair of light receiving means, performs a shifting of the optical system in response to the measured amount of focal deviation, and terminates the shifting of the optical system when the above stated signal difference is in a predetermined in-focus range. The apparatus includes a means for enlarging the in-focus range in the event that the amount of light incident on the above stated two light receiving means is smaller than that prescribed, and thus the invention makes possible the supplying of a superior auto-focus adjustment apparatus which can reliably perform auto-focus adjustments in the presence of the disturbing light, and even in the event that the received light signal quantity is small due to a photo-subject being at a comparatively great distance or the reflexibility of a photo-subject being poor, and which furthermore does not increase energy consumption.

BRIEF DESCRIPTION OF THE DRAWINGS

The objects and features of the present invention will become more apparent from a consideration of the following detailed description taken in conjunction with the accompanying drawings in which:

FIG. 1 is a schematic view showing the arrangement of a prior art auto-focus adjustment apparatus;

FIG. 2 is a block diagram showing one example of a circuit of a prior art auto-focus adjustment apparatus;

FIG. 3 is a graphic view showing the operation of the arrangement of FIG. 2;

FIG. 4 is a block diagram showing a different prior art arrangement;

FIG. 5 is a graphic view explaining a problematical point in a prior art apparatus;

FIG. 6 through FIG. 10 show embodiments according to the present invention;

FIG. 7 is a graphic view explaining the effect of the present invention;

FIG. 8 is a block diagram explaining a second embodiment of the present invention;

FIG. 9 is a block diagram explaining a third embodiment of the present invention; and FIG. 10 is a graphic view explaining a modified embodiment of the present invention.

DETAILED DESCRIPTION OF THE PREFERRED EMBODIMENTS

The invention will be described in connection with FIGS. 6 to 10 showing preferred embodiments according to the present invention, in which parts of units identical to those in the prior art carry the identical reference numbers and a detail description thereof will be omitted.

Figure 2:
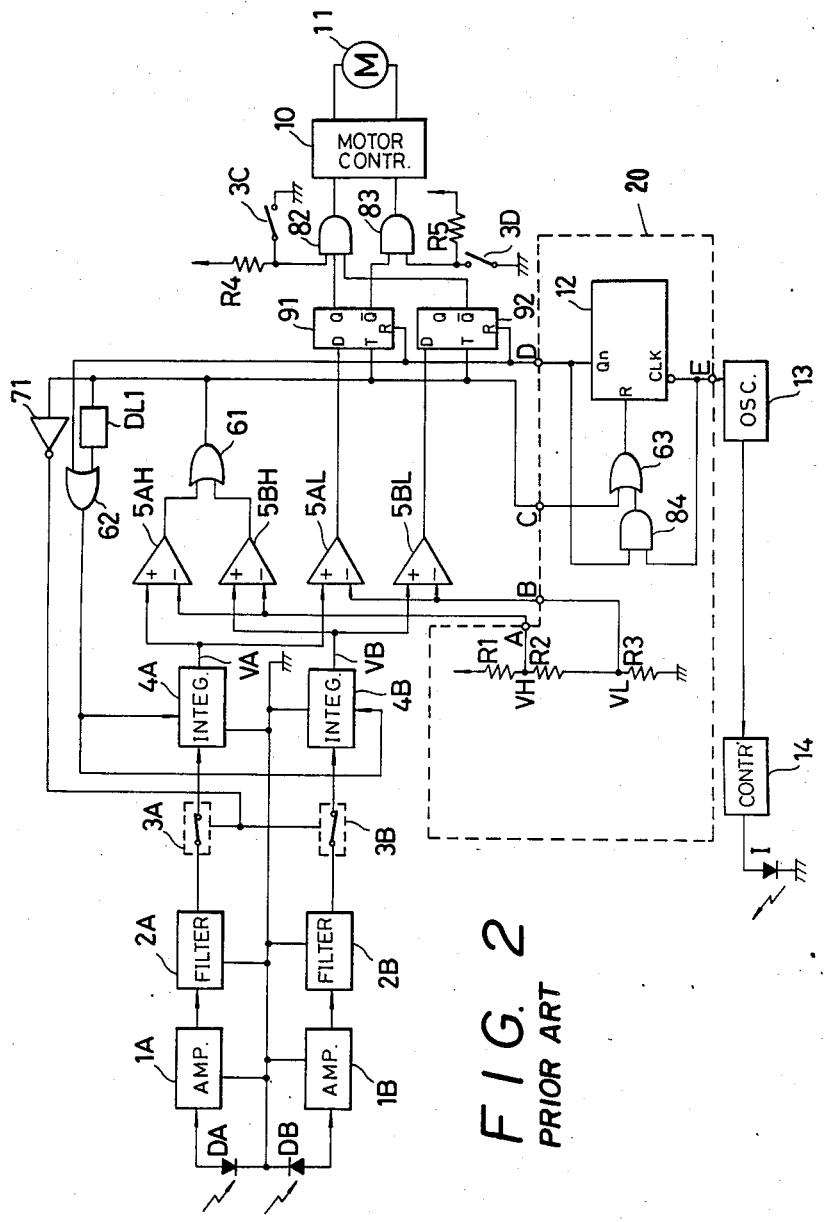
Figure 6:
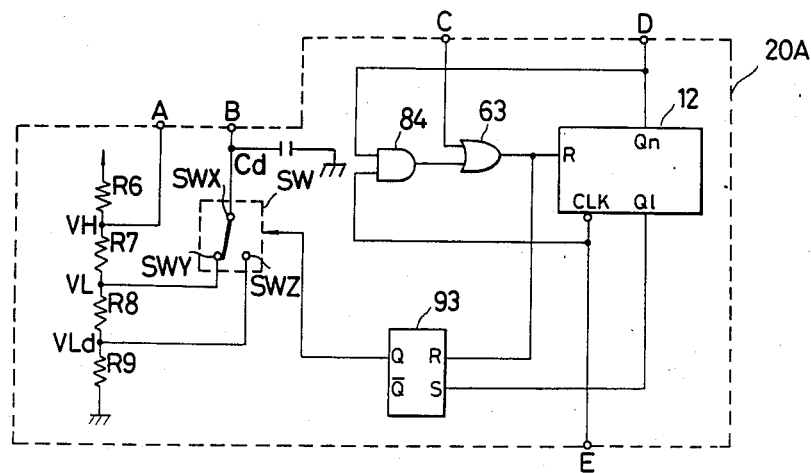

FIG. 6 shows an embodiment which improves the block 20 of FIG. 2 which determines the length of the integration period. Accordingly, it is possible to provide an auto-focus adjustment apparatus according to the present invention by replacing the block 20 of FIG. 2 with this block 20A.

The block 20A differs from the block 20 in the providing of an output Q1, in the counter 12, and the providing of a RS flip-flop 93 which is set by this output Q1 and reset according to the counter 12. An electrically operated switch SW is controlled by the non-inverting output Q of the RS flip-flop 93. The switch SW serves to change the reference voltage which is applied through the connection point SWX to the point B and to the comparators 5AL, 5BL.

The reference voltages for the comparator are created by the serial connection of resistors R6-R9. The voltage at the connection point of the resistors R6 and R7 is output to the point A as the higher reference voltage VH. The voltage VL at the connection point of the resistors R7 and R8 is fed to the connection point SWY of the switch SW, and the voltage VLd at the connection point of the resistors R8 an R9 is fed to the connection point SWZ, and one or the other of these is output as the reference voltage for the comparators 5AL and 5BL.

In the above arrangement, when at the completion of an integration of a previous focus adjustment cycle, either a positive pulse appears at the point C, or a positive pulse appears at the output of the AND-gate 84 according to the output Qn of the counter 12 which determines the maximum period of integration, the OR-gate 63 outputs a positive pulse and resets the counter 12.

At the same time, the RS flip-flop 93 is reset, its non-inverting output Q becomes low level, and the switch SW becomes conductive across the path between the connection points SWX and SWY, whereupon the reference voltage VL is output through point B to the comparators 5AL and 5BL. Accordingly, the range of integration voltages within which an in-focus condition will be adjudged is established by the range of voltages VH-VL.

In the event that the next integration is completed in a short time before the output Q1 of the counter 12 appears, an in-focus/out-of-focus condition is ascertained, as per the exemplary prior art, with the range of voltages VH-VL.

When a photo-object is at a distance, resulting in reception of a weaker light signal, increase in integration time, and appearance of the output Q1 of the counter 12 prior to the completion of integration, the RS flip-flop 93 is accordingly set, the control input of the switch SW becomes high level, and the path between the connection points SWX and SWZ is rendered conductive. Accordingly, the reference voltage VLd is fed to the comparators 5AL and 5BL.

In other words, the in-focus range increases from VH-VL to VH-VLd. Thus, even in the event that the signal to noise ratio deteriorates, and the instability of the integration values increases due to the great distance of a photo-subject, it is possible to prevent mistaken shifting of the objective. This process is shown in FIG. 7.

Figure 1:
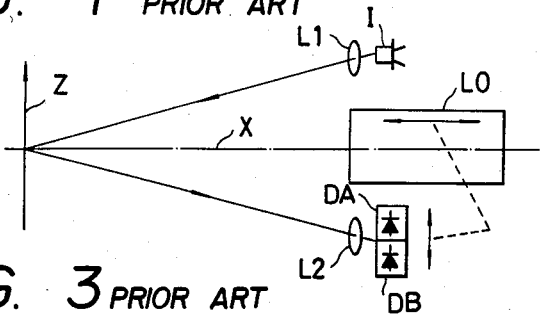
FIG. 1 through FIG. 5 show different embodiments in prior arts.
Figure 3:
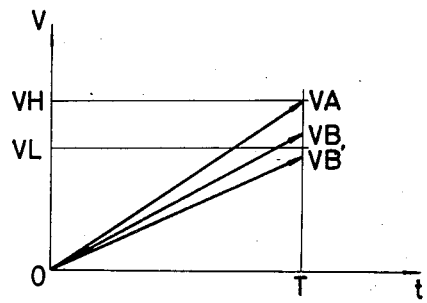
Figure 5:
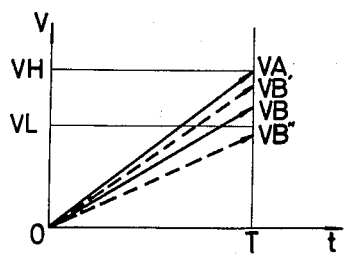
Figure 7:
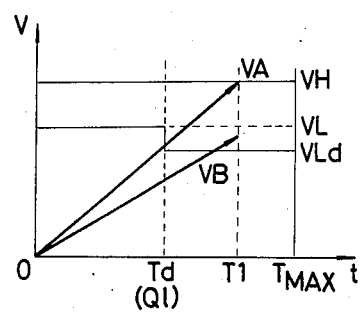

FIG. 7 is similar to FIG. 3 and FIG. 5. Td shows the timing of the output Q1 of the counter 12. In the event that the integration period is long, the lower reference voltage is replaced subsequent to this point by VLd, and the in-focus range is increased to VH-VLd. Thus, even in the event the integration value VB has become smaller, the in-focus state is reached without causing needless shifting of the objective. It will be understood that even if the signal to noise ratio of the received light signal component deteriorates, and an instability is created in the integration values in a manner explained in the section concerning the example in the prior art, the apparent dead zone does not expand.

Figure 8:
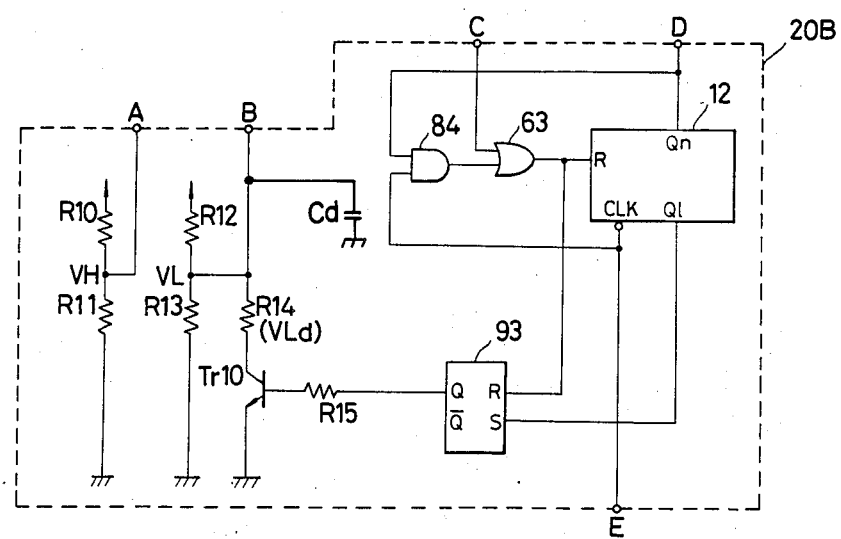

FIG. 8 shows a block 20B, which is a partial modification of the block 20A of FIG. 6.

A transistor Tr10 is used to produce the lower reference voltage VL. The voltage VH which produces a signal to the point A is created by the voltage division of the resistors R10 and R11. Further, the voltage VL is created by the serial connection of the resistors R12 and R13, and the voltage VLd is created by the serial connection of the resistor R12 to the adjacently connected resistors R13 and R14.

According to the above arrangement, with a normal range integration period, the RS flip-flop 93 is reset, and the reference voltages for the comparators 5AL and 5BL are supplied by the voltage VL which is determined by the resistors R12 and R13 only. However, in the event the integration period grows longer, the RS flip-flop 93 is set by the output Q1 of the counter 12, the transistor Tr10 is rendered conductive, and the voltage VLd created by the serial connection of the resistor R12 to the adjacently connected resistors R13 and R14 is fed to the comparators 5AL and 5BL. At this time, the voltage drop between the collector and emitter of the transistor Tr10 is regarded as sufficiently low.

Thus, according to the above embodiment, it is possible to increase the in-focus range to VH-VLd in a low light signal domain, and obtain an effect similar to that stated above. Integration advances in a manner similar to that shown in FIG. 7.

Figure 4:
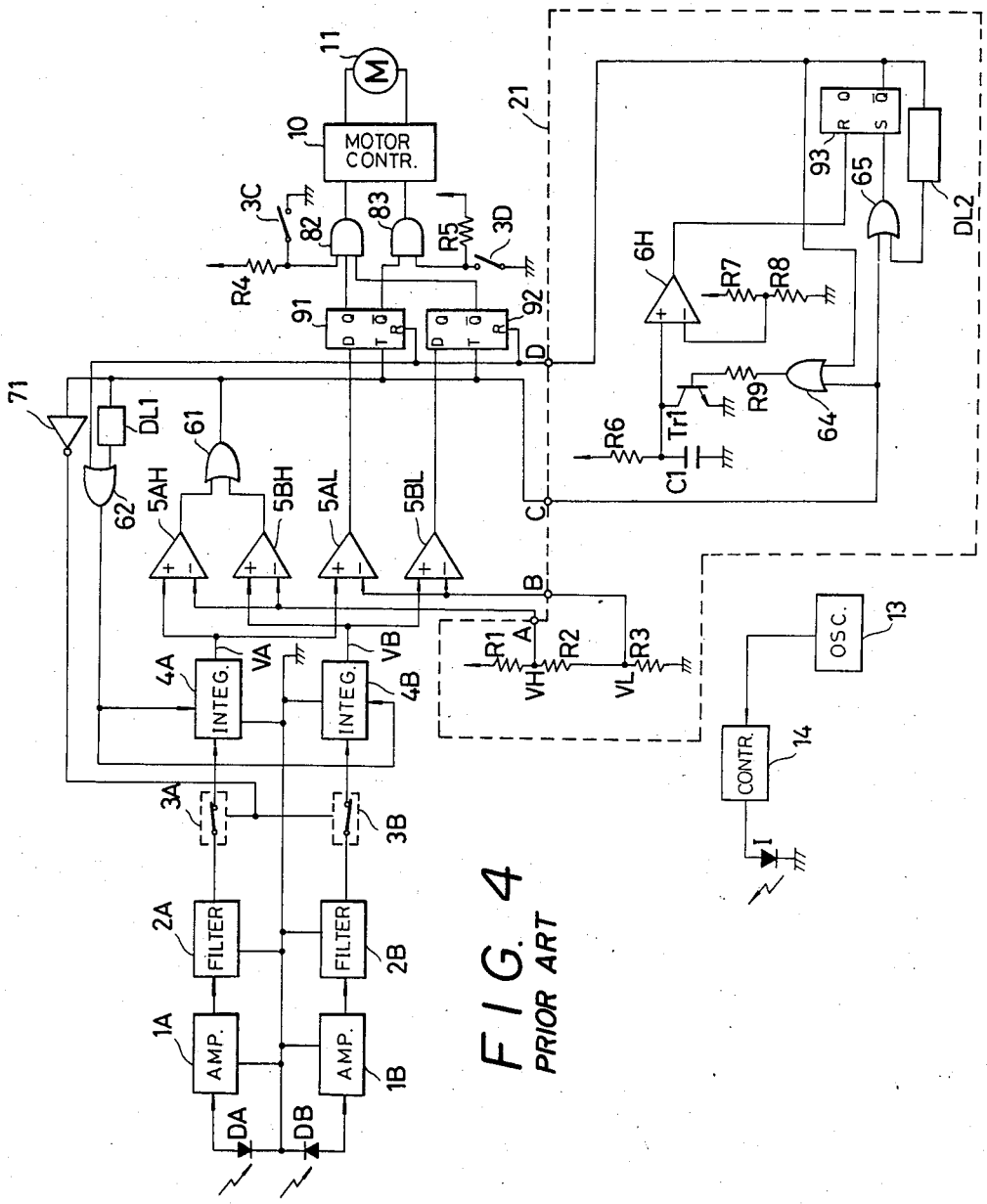

FIG. 9 shows an embodiment of an improved version of the block 21 of FIG. 4 which determines the length of the integration period. It is possible to provide an auto-focus adjustment apparatus by replacing the block 21 of FIG. 4 with the block 21A.

FIG. 9 differs from FIG. 4 in the providing of a comparator 6L which compares the same inputs as the comparator 6H. The reference voltages for the comparators 6L and 6H are fed from the serial connections of resistors R7, R16 and R17. The reference voltage for the comparator 6L comes from the voltage division point of the resistors R16 and R17, and the reference voltage for the comparator 6H comes from the voltage division point of the resistors R7 and R16. The composite resistance value of the resistors R16 and R17 is established identically to that of the resistor R8 of FIG. 4, and a reference voltage the same as that of FIG. 4 is fed to the comparator 6H.

The output of the comparator 6L comes to control the switch SW which is constructed similarly to that of FIG. 6. The switch SW selects the terminals SWY or SWZ to produce the voltages VL and VLd which are established by the resistors R6'-R9'.

In the above arrangement, in the normal domain of received light quantity, the electrical potential of the capacitor C1 is compared by the comparator 6L to the reference voltage determined by the resistors R16 and R17. In the event that the electrical potential of the capacitor C1 is lower than this reference voltage, the output of the comparator 6L is low level, the path between the connection points SWX and SWY of the switch SW is closed, and the voltage VL is fed as the reference voltage through the point B to the comparators 5AL and 5BL. At this time, the in-focus range is voltage VH-VL.

In the event that the amount of received light is small and the integration period long, the charge of the capacitor C1 advances, and hence at some point comes to exceed the divided voltage point of the resistors R16 and R17. When the comparator 6L inverts, the path between the connection points SWX and SWZ of the switch SW is closed, and the reference voltage VLd is fed to the comparators 5AL and 5BL, whereupon the in-focus range increases to VH-VLd.

It is possible in the above manner to obtain an effect similar to that previously stated. The advance of integration is similar to that in FIG. 7.

Three embodiments have been explained above, however the time Td of FIG. 7 is determined in the first and second embodiments by the output Q1 of the counter 12, and in the third embodiment by the capacitor C1, and the resistors R6, R7, R16 and R17.

Further, FIG. 10 shows the working of a preferred embodiment in which, at time Td, the reference voltage VL is not suddenly changed to VLd, but may be gradually made to shift to the level of VLd. The reason for this is that in the event that the V1-VLd transition is made all at once, the in-focus/out-of-focus criteria immediately before and after the shift from electrical potential VL to electrical potential VLd, undergo a large modification, and the apparent dead zone of the ascertainment immediately following the shift is too great.

In order to perform the gradual electrical potential VL-VLd shift, an appropriate capacitor cd connected to the point B of the blocks 20A, 20B and 21A. In this case, it is possible to realize a smooth electrical potential shift such as that shown in FIG. 10 using the time constant determined by the resistors, and the capacitor which is connected to the point B.

In any of the embodiments explained above, supplemental circuit elements are few, making implementation easy and inexpensive, and since there is no need to increase the strength of the light source used for the radiation of the signal light, power consumption may be managed efficiently.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention should not be limited to the particular embodimemnt disclosed as the best mode contemplated for carrying out the invention, but that the invention will include all embodiments falling within the scope of the appended claims.

We claim:

1. An automatic focus adjustment apparatus for use with a photographic or video camera comprising:
   a light emitting element for radiating light to a subject to be photographed;
   a pair of photo-detector means;
   an optical system for directing into said pair of photo-detector means a reflected light portion of the light radiated from said light emitting element to said subject to be photographed;
   an imaging optical system for imaging said subject;
   a first integrator connected to one of said pair of photo-detector means for integrating an amount of light received by said one photo-detector means and for producing a first integral signal corresponding thereto;
   a second integrator connected to the other of said pair of photo-detector means for integrating an amount of light received by said other photo-detector means and for producing a second integral signal corresponding thereto;
   comparator means having first and second reference levels with which said first and second integral signals are compared, said first reference level being higher than said second reference level;
   an automatic focusing means for shifting said imaging optical system along its optical axis when said first integral signal has reached said first high reference level before said second integral signal has reached said second low reference level, so that each of said pair of photo-detector means receives a substantially equal amount of light reflected from said subject to be photographed; and
   counting means for producing a time signal when a predetermined time has elapsed, and means for lowering said second low reference level to enlarge an in-focus range when neither of said first and second integral signals reaches said first high reference level until said counting means produces said time signal.

2. An apparatus as set forth in claim 1, said wherein said means for lowering said second low reference level effects said lowering suddenly.

3. An apparatus as set forth in claim 1, wherein said means for lowering said second low reference level effects said lowering gradually.

4. In automatic focus adjustment apparatus for a photographic or video camera comprising:

light emitting means for radiating light to a subject to be photographed;

a pair of photo-detector means;

an optical system for directing into said pair of photo-detector means a reflected light portion of light radiated from said light emitting means to said subject, an imaging optical system for imaging said subject;

first integrator means connected to one of said pair of photo-detector means for integrating an amount of light received by said one photo-detector means and for producing a first integral signal corresponding thereto;

second integrator means connected to the other of said pair of photo-detector means for integrating an amount of light received by said other photo-detector means and for producing a second integral signal corresponding thereto;

comparator means having first and second reference levels with which said first and second integral signals are compared, said first reference level being higher than said second reference level;

means for supplying reference voltages to said comparators means to determine the length of the integration period;

automatic focusing means controlled by the output of said comparators to shift said imaging optical system along its optical axis so that each of said pair of photo-detector means receives a substantially equal amount of light reflected from said subject;

the improvement which comprises:

said reference voltage supplying means comprising means for supplying a plurality of different voltages;

pulse counting means for establishing a maximum period of integration; and switching means controlled by said pulse counting means for effecting a change of reference voltage when the period of integration exceeds a predetermined value.

5. Automatic focus adjustment apparatus according to claim 4, in which said reference voltage supplying means comprises a series of resistors with taps between said resistors and said switching means comprises an electric switch for connecting different ones of said taps with said comparator means.

6. Automatic focus adjustment apparatus according to claim 4, in which said switching means comprises a transistor connected in parallel with a resistor.

7. Automatic focus adjustment apparatus according to claim 4, comprising means for effecting said reference voltage change gradually.

* * * * *